United States Patent
Yokota et al.

(10) Patent No.: US 7,328,351 B2
(45) Date of Patent: Feb. 5, 2008

(54) MAIL PROCESSING APPARATUS AND METHOD

(75) Inventors: Tomofumi Yokota, Kanagawa (JP); Naoyasu Terao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 698 days.

(21) Appl. No.: 10/396,378

(22) Filed: Mar. 26, 2003

(65) Prior Publication Data

US 2003/0217261 A1 Nov. 20, 2003

(30) Foreign Application Priority Data

Mar. 29, 2002 (JP) .............................. 2002-098011

(51) Int. Cl.
*H04L 9/32* (2006.01)
*H04L 9/00* (2006.01)

(52) U.S. Cl. .................. 713/189; 713/176; 713/193

(58) Field of Classification Search ................ 713/150, 713/161–162, 168, 170, 176, 181, 188–189; 726/26, 30

See application file for complete search history.

(56) References Cited

U.S. PATENT DOCUMENTS 6,367,013 B1 * 4/2002 Bisbee et al. ................ 713/178
7,127,741 B2 * 10/2006 Bandini et al. ............... 726/14

2003/0188167 A1 10/2003 Kurosaki et al.

FOREIGN PATENT DOCUMENTS

JP 09-321791 12/1997

OTHER PUBLICATIONS

Tsunoru Nakashima, Nikkei Internet Technology, "Email, Filtering Software Progress in Blocking Secret Information and Supporting Attachment Files and Encoded E-mail", No. 31, pp. 120-127, Jan. 22, 2000.
U.S. Appl. No. 10/340,608 filed Jan. 13, 2003.

* cited by examiner

*Primary Examiner*—Hosuk Song
(74) *Attorney, Agent, or Firm*—Oliff & Berridge, PLC

(57) ABSTRACT

An mail processing apparatus for confirming contents of encrypt mail. Electronic mail delivered in MTA is received by a receiving section. When the received electronic mail has been encrypted or an electronic signature has been affixed, signature verification and decoding are performed by an electronic signature verification/decoding section. The contents of the mail in which the signature verification and the decoding are performed are confirmed by a content confirmation section. Subsequent to this, a signature and encryption are properly performed with respect to the mail by an electronic signature/encryption section. Mail of an account destination of a mail server is held in a spool. The spooled mail is taken out using a delivery part by a mail user agent device. Mail of an account destination of another mail server is delivered to another mail server destination through the delivery section.

18 Claims, 14 Drawing Sheets

FIG. 3

| NAME | ROLE | NOTE |
|------|------|------|
| ALICE | SENDER | MAIL ADDRESS: alice@foo.org |
| BOB | RECEIVER | REAL MAIL ADDRESS: bob@mail.bar.com<br>ALIAS MAIL ADDRESS: bob@bar.com<br>OWNER OF SECRET KEY OF CERTIFICATE OF<br>: bob@mail.bar.com |
| SERVER | MAIL SENDING AND RECEIVING SERVER | OWNER OF SECRET KEY OF CERTIFICATE OF<br>: bob@bar.com |

FIG. 6

| NAME | ROLE | NOTE |
|---|---|---|
| ALICE | RECEIVER | MAIL ADDRESS: alice@foo.org |
| BOB | SENDER | REAL MAIL ADDRESS: bob@mail.bar.com<br>ALIAS MAIL ADDRESS: bob@bar.com<br>OWNER OF SECRET KEY OF CERTIFICATE OF<br>: bob@mail.bar.com |
| SERVER | MAIL SENDING AND RECEIVING SERVER | OWNER OF SECRET KEY OF CERTIFICATE OF<br>: bob@bar.com |

FIG. 9

| NAME | ROLE | NOTE |
|---|---|---|
| ALICE | RECEIVER | REAL MAIL ADDRESS: alice@mail.bar.com<br>ALIAS MAIL ADDRESS: alice@bar.com<br>OWNER OF SECRET KEY OF CERTIFICATE OF<br>: alice@mail.bar.com |
| BOB | SENDER | REAL MAIL ADDRESS: bob@mail.bar.com<br>ALIAS MAIL ADDRESS: bob@bar.com<br>OWNER OF SECRET KEY OF CERTIFICATE OF<br>: bob@mail.bar.com |
| SERVER | MAIL SENDING AND RECEIVING SERVER | OWNER OF SECRET KEY OF CERTIFICATE OF<br>: alice@bar.com<br>OWNER OF SECRET KEY OF CERTIFICATE OF<br>: bob@bar.com |

FIG. 12

| NAME | ROLE | NOTE |
|---|---|---|
| ALICE | RECEIVER | MAIL ADDRESS: alice@foo.org |
| BOB | SENDER | REAL MAIL ADDRESS: bob@mail.bar.com<br>ALIAS MAIL ADDRESS: bob@bar.com<br>OWNER OF SECRET KEY OF CERTIFICATE OF<br>: bob@mail.bar.com |
| SERVER | MAIL SENDING AND RECEIVING SERVER | OWNER OF SECRET KEY OF CERTIFICATE OF<br>: bob@bar.com |

MAIL PROCESSING APPARATUS AND METHOD

BACKGROUND OF THE INVENTION

1. Field of the Invention

This invention relates to a mail processing technique for confirming the contents of encryption mail.

2. Background Art

In encryption mail, an originator performs encryption and a receiver performs decoding. The contents therefore cannot be confirmed in a relay server. When the contents of the mail cannot be confirmed, censorship of mail or a computer virus of a type sent with the virus attached to the mail cannot be exercised and serious damage is caused to companies.

SUMMARY OF THE INVENTION

The invention is implemented in consideration of the circumstances described above, and an object of the invention is to enable the contents of encryption mail to be confirmed in a path on the way.

Also, another object of the invention is to enable electronic signature information to be intensively managed and enable reliable mail delivery to be ensured.

According to the invention, configurations as mentioned below are adopted in order to achieve the objects.

In order to achieve the objects, the invention provides a mail processing apparatus, including: a receiving section which receives encryption mail; a section which decodes the received encryption mail; a section which encrypts the decoded mail; and a section which delivers the encrypted mail to a destination.

The invention also provides a mail processing apparatus including: a receiving section which receives encryption mail; a section which decodes the received encryption mail; a content confirmation section which confirms contents of the decoded mail; a section which encrypts the mail whose contents are confirmed; and a section which delivers the encrypted mail to a destination.

In these configurations, the encryption mail is decoded on the way, so that the contents can be confirmed. A confirmation target is a computer virus, secret information or anti-social words.

The mail content confirmation apparatus may be built as a mail server (mail transfer agent device), or may be built as a front end device or a back end device of the mail server.

The invention further provides a mail processing apparatus including: a section which receives signature mail; a section which verifies an electronic signature of the signature mail; a signature section which affixes a new electronic signature to the signature mail or mail in which the electronic signature is removed from the signature mail; and a section which delivers the mail to which the new electronic signature is affixed.

In this configuration, information used in a signature can be managed intensively.

The invention further provides a mail content confirmation apparatus, including: a section which receives encryption signature mail; a section which decodes encryption mail; a section which verifies an electronic signature of the decoded mail; a content confirmation section which confirms contents of the decoded mail; a section which affixes a new electronic signature to the mail whose contents are confirmed; a section which encrypts the mail to which the new electronic signature is affixed; and a section which delivers the encrypted mail to which the new electronic signature is affixed to a destination.

In this configuration, the encryption mail is decoded on the way, so that the contents can be confirmed and also information used in a signature can be managed intensively.

The invention further provides a mail processing apparatus, including: a receiving section which receives encryption mail sent from a first user to a proxy mail address of a second user; a decoding section which decodes the encryption mail by a secret key corresponding to the proxy mail address of the second user; and a sending section which sends the decoded encryption mail to a real mail address of the second user.

In this configuration, a mail address of a user (second user) is set to two types of a proxy mail address and a real mail address, and flexible management can be performed. Even when one address changes, it can cope by modifying association of both types of address. Intensive management of the mail address can be performed. A confirmation section for confirming the contents of the decoded encryption mail may be provided further. In "proxy" mail address or "real" mail address, various names can be given without departing from the subject matter. The "proxy" mail address may be called a "second" mail address, and the "real" mail address maybe called a "first" mail address. The "proxy" mail address maybe called an "alias" mail address or a "virtual" mail address.

The invention further provides a mail processing apparatus, including: a receiving section which receives first encryption mail sent from a first user to a proxy mail address of a second user; a decoding section which decodes the first encryption mail by a secret key corresponding to the proxy mail address of the second user; an encryption section which generates second encryption mail in which the contents of the decoded first encryption mail are encrypted by a public key corresponding to a real mail address of the second user; and a sending section which sends the second encryption mail to the real mail address of the second user.

In this configuration, the encryption mail is decoded on the way, so that the contents can be confirmed. A confirmation target is a computer virus, secret information or anti-social words. Of course, intensive management of the mail address can be performed.

Incidentally, the invention can be implemented not only as an apparatus or a system but also as a method. Also, it goes without saying that a part of such invention can be configured as software. Also, it goes without saying that a software product (record medium) used for making a computer execute such software is also included in the technical scope of the invention.

BRIEF DESCRIPTION OF THE DRAWINGS

The present invention may be more readily described with reference to the accompanying drawings:

FIG. 3 is an explanatory diagram using an example of content confirmation of encryption mail from the outside of a company to the inside of the company in the embodiment.

FIG. 6 is an explanatory diagram using an example of content confirmation of signature mail from the inside of a company to the outside of the company in the embodiment.

FIG. 9 is an explanatory diagram using an example of content confirmation of encryption signature mail from the inside of a company to the inside of the company in the embodiment.

FIG. 12 is an explanatory diagram using an example of content confirmation of encryption signature mail from the inside of a company to the outside of the company in the embodiment.

DETAILED DESCRIPTION OF THE PREFERRED EMBODIMENTS

Figure 1:
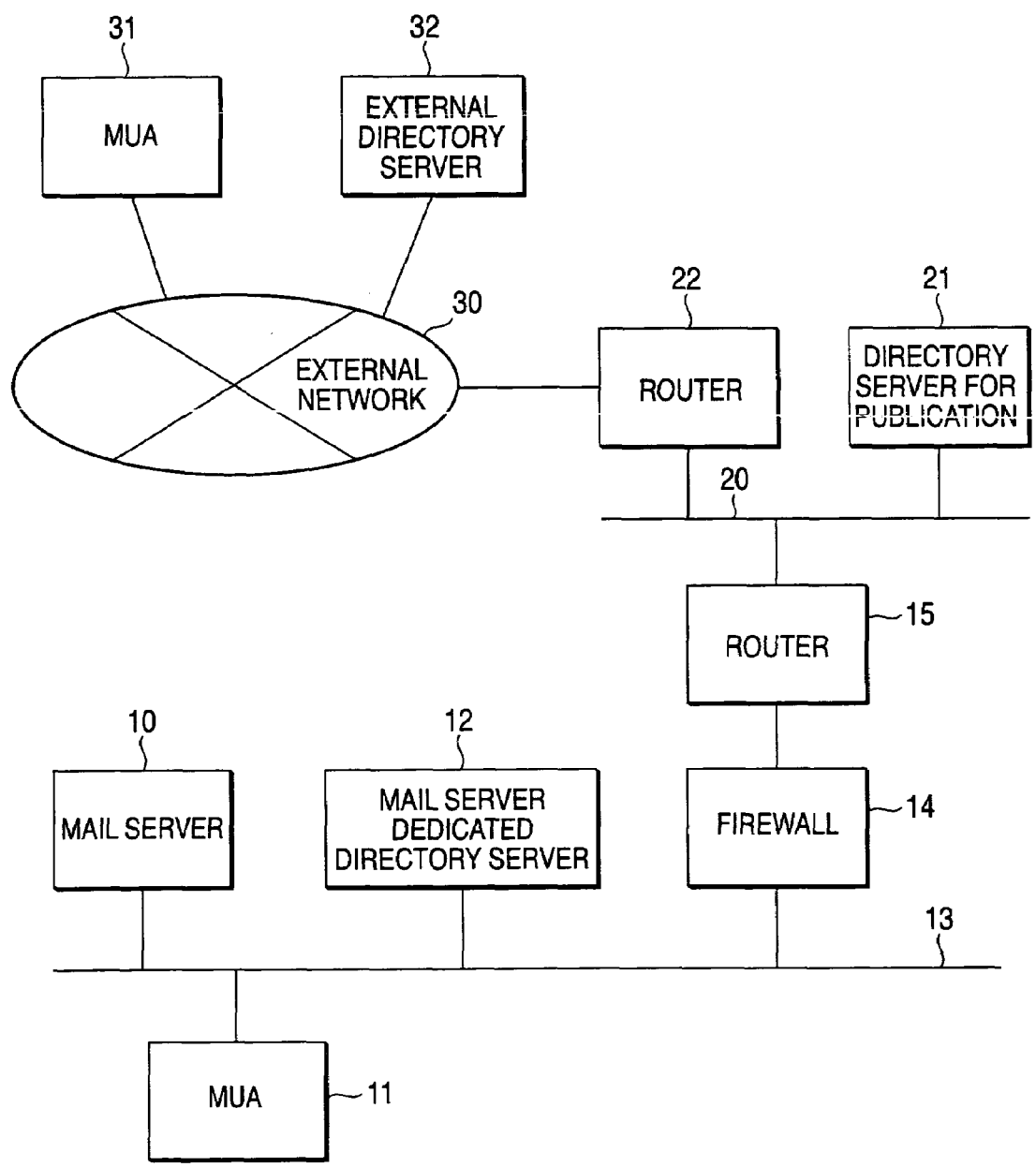
FIG. 1 is a diagram describing a network environment of an embodiment of this invention.

FIG. 1 shows a network environment of this embodiment. In this embodiment, a user of the inside of an organization of a predetermined company and a user of the outside of the organization are premised, and communication of mail between the inside users and communication of mail between the inside user and the outside user are processed. Then, the contents of the mail are confirmed in the case of the communication of the mail. That is, it is confirmed that a message is scanned and a computer virus is not included or an improper word is not included. In FIG. 1, a mail server (mail transfer agent device) 10, a mail user agent device 11 and a mail server dedicated directory server 12 are connected to an in-house LAN (LAN segment) 13. The LAN 13 is connected to an external network 30 such as the Internet through a firewall 14, a router 15 and so on. Also, a server for external publication such as a directory server 21 for publication is placed to another in-house LAN (LAN segment) 20. The LAN 20 is connected to the external network 30 through a router 22. A mail user agent device 31 of the outside user is connected to the external network 30. Also, an external directory server 32 for storing and managing a certificate of the outside user is provided. Incidentally, in the drawing, representation of a domain name system server etc. is omitted.

In this example, a real mail address and an alias mail address are provided in an in-house user (a user having an account in the mail server 10) The real mail address is a mail address of a real account, and the alias mail address is a mail address of an alias. It is not particularly concerned with an outside user (a user having an account in another mail server). The mail server dedicated directory server 12 stores and manages secret keys corresponding to a certificate of the real mail address of the in-house user and a certificate of the alias mail address of the in-house user. In the mail server dedicated directory server 12, measures on security in which only access in a secure line such as SSL is accepted so that the certificate of the real mail address does not leak are desirably taken. The directory server 21 for publication stores and manages the certificate of the alias mail address of the in-house user. The certificate of the outside user is stored and managed in the external directory server 32 as described above.

Figure 2:
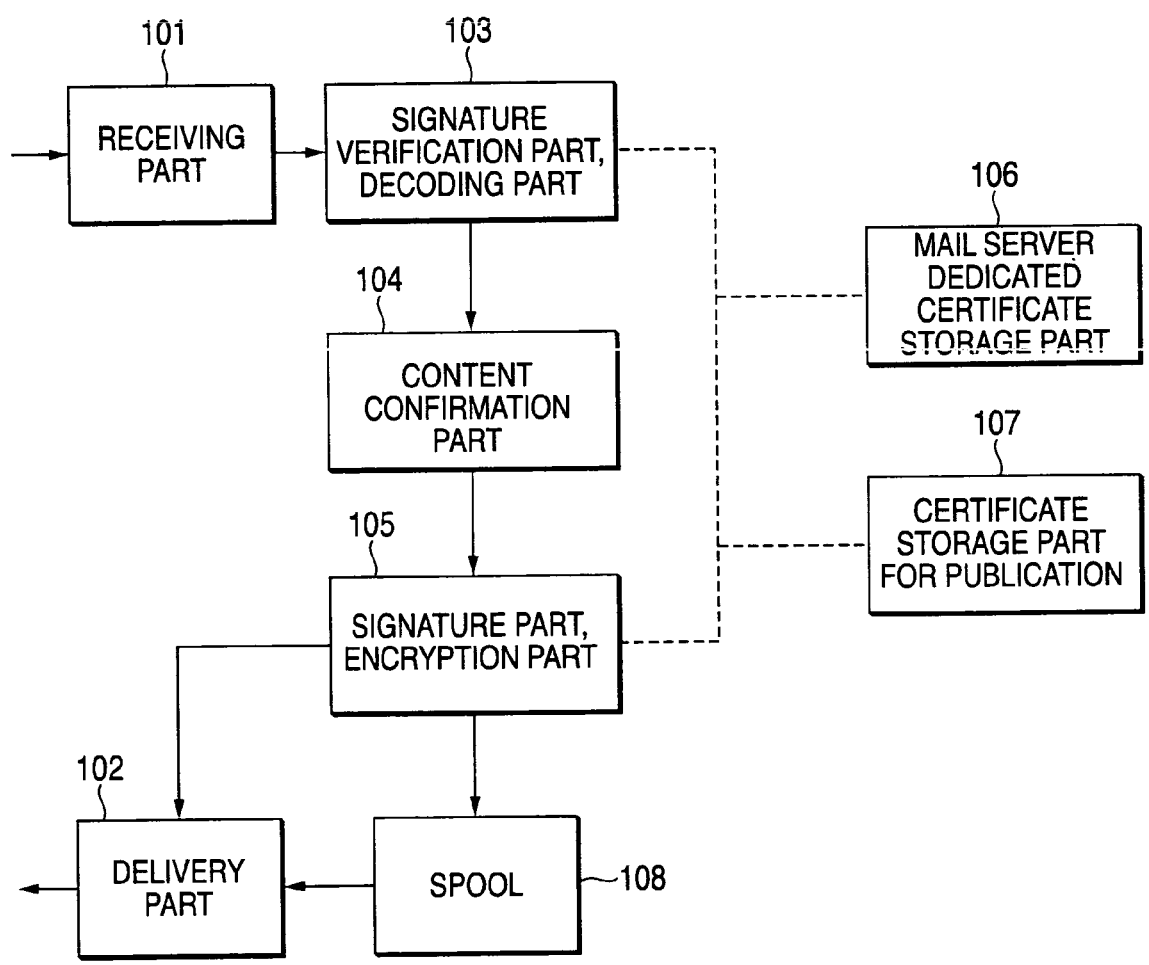
FIG. 2 is a block diagram schematically showing a configuration of a mail server of the embodiment.

FIG. 2 schematically shows the mail server 10 of this embodiment and in this drawing, the mail server 10 includes a receiving part 101 for receiving electronic mail, a delivery part 102 for delivering the electronic mail, an electronic signature verification/decoding part 103 for verifying or decoding an electronic signature of the received electronic mail, a content confirmation part 104 for confirming the contents of the electronic mail, an electronic signature/encryption part 105 for encrypting the electronic mail of a delivery target or affixing the electronic signature, a mail server dedicated certificate storage part 106 used by only the mail server 10, a certificate storage part 107 for publication for going public to a general user, and a spool 108 for holding the mail. The server dedicated certificate storage part 106 may be the mail server dedicated directory server 12 of FIG. 1 or may be its subset. The certificate storage part 107 for publication may be the directory server 21 for publication or the external directory server 32 or may be its subset.

Electronic mail delivered in MTA (mail transfer agent) is received by the receiving part 101. In this example, mail from an outside user to an inside user destination, mail from an inside user to an outside user destination and mail between inside users are received by the receiving part 101. A destination mail address of mail of the outside user destination is a normal address (mail address of the outside user). An originating source mail address of mail from the outside user is also a normal address (mail address of the outside user) A destination mail address of mail of the inside user destination is constructed so as to use an alias mail address. An originating source mail address of mail from the inside user is constructed so as to use a real mail address.

When the received electronic mail has been encrypted or the electronic signature has been affixed, signature verification and decoding are performed by the electronic signature verification/decoding part 103. The contents of the mail in which the signature verification and the decoding are performed are confirmed by the content confirmation part 104. Subsequent to this, a signature and encryption are properly performed with respect to the mail by the electronic signature/encryption part 105. Mail of an account destination of the mail server 10 is held in the spool 108. The spooled mail is taken out using the delivery part 102 by the mail user agent device 11. Mail of an account destination of another mail server 10 is delivered to another mail server destination through the delivery part 102.

The electronic signature verification/decoding part 103 performs signature verification and decoding as follows. When mail of the inside user destination (alias mail address) has been encrypted (encrypted using a certificate of the alias mail address), the decoding is performed using a secret key (a secret key corresponding to the certificate of the alias mail address) stored in the server dedicated certificate storage part 106. When mail from the inside user (real mail address) has a signature, the signature verification is performed using a certificate of the real mail address stored in the server dedicated certificate storage part 106.

The electronic signature/encryption part 105 performs a signature and encryption as follows. A destination address of mail of the inside user destination is converted from the alias mail address to the real mail address and the encryption is performed using the certificate of the real mail address stored in the server dedicated certificate storage part 106. An originating source address of mail from the inside user (real mail address) is converted from the real mail address to the alias mail address and the signature is affixed using a secret key (a secret key corresponding to the certificate of the alias mail address) stored in the server dedicated certificate storage part 106.

Incidentally, as described later, in mail sent from the inside to the outside, a user does not perform encryption using a certificate of an outside user but the mail server 10 performs encryption. When mail to the outside user has already been encrypted, a secret key of the outside user cannot be acquired and the contents cannot be confirmed in its state, so that the mail is discarded.

An operation of this embodiment will be described below in detail.

Here, S/MIME is used as a format of encryption mail. In order to use the encryption mail of S/MIME, it is necessary to have a certificate issued from certificate authority (CA) Also, as described already, it is necessary for the inside user to have two mail addresses of a real mail address and an alias mail address and also have certificates including the respective mail addresses issued from the CA.

The mail server 10 has functions of signature conversion, encryption, decoding and content confirmation, and performs content confirmation of the encryption mail. Also, it is formed in specifications in which mail arriving at the alias mail address is transferred to the real mail address.

[Content Confirmation of Encryption Mail from the Inside to the Outside]

Figure 4:
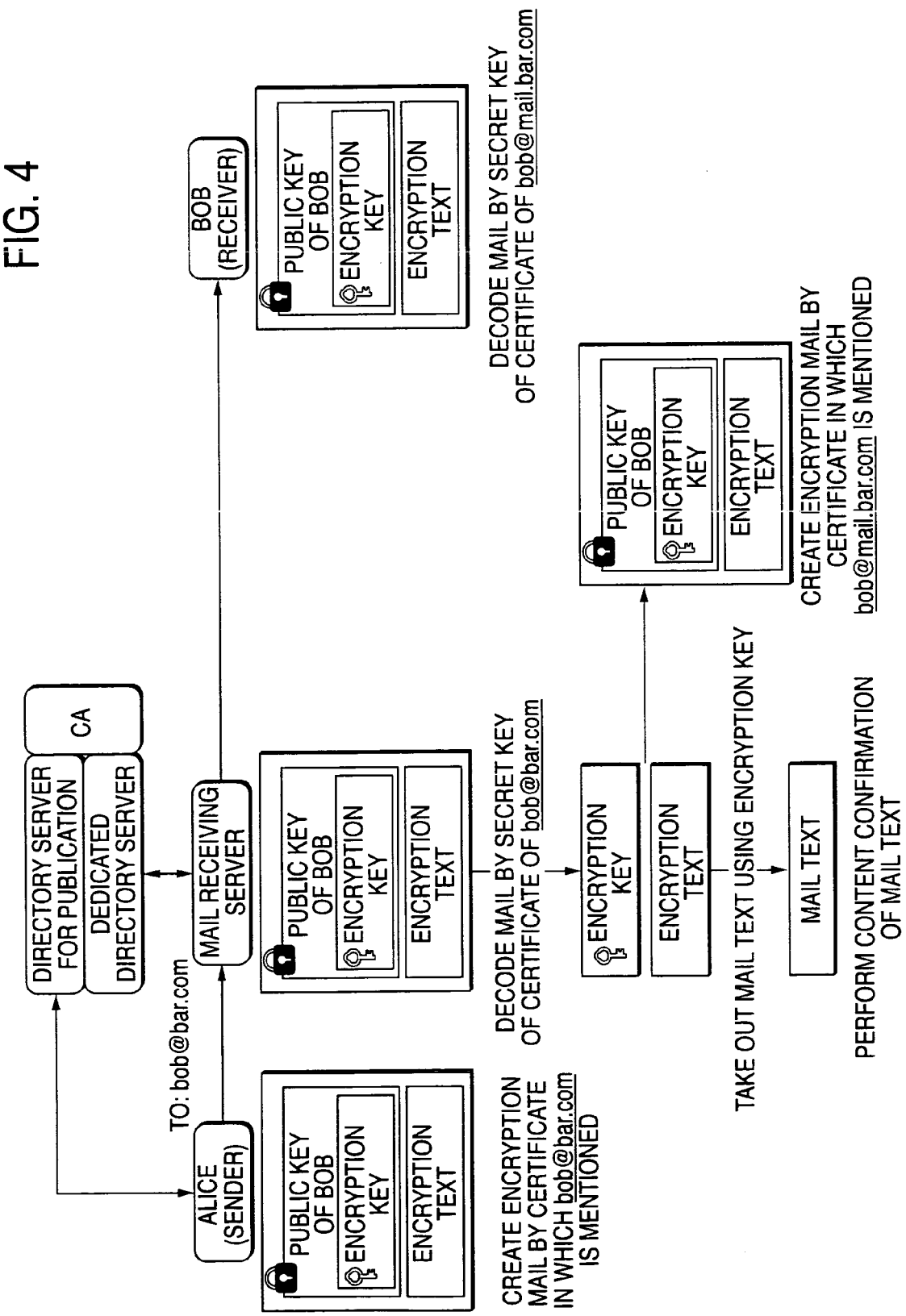
FIG. 4 is a diagram describing a flow of mail or processing to mail in the example of FIG. 3.
Figure 5:
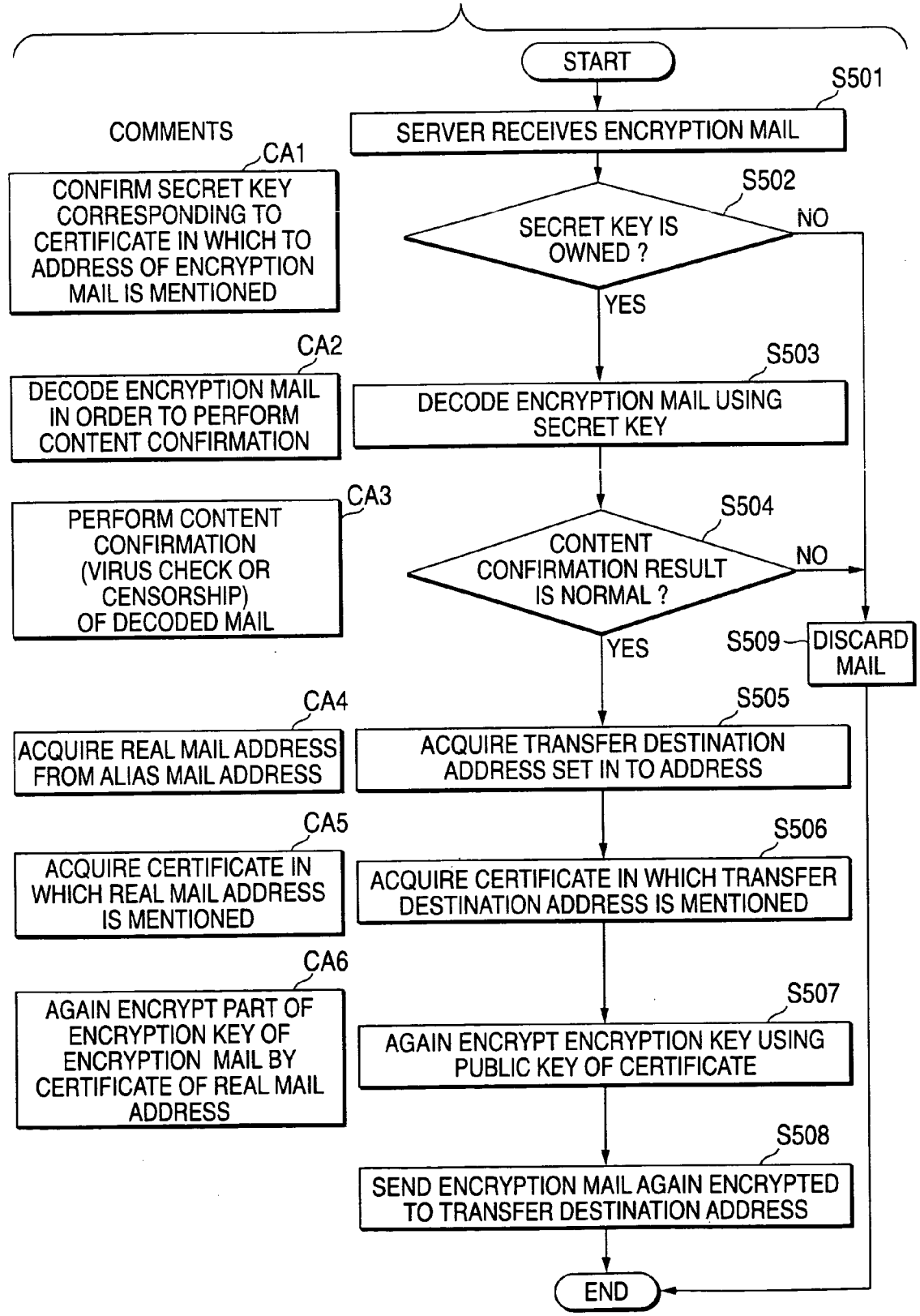
FIG. 5 is a flowchart describing an operation of the mail server in the example of FIG. 3.

First, content confirmation of encryption mail from the inside to the outside will be described. Here, characters as shown in FIG. 3 appear. A content confirmation method of encryption mail and a sending method at the time when Alice (the outside of a company) sends encryption mail to Bob (the inside of the company) will be described. FIG. 4 schematically shows a summary of processing to mail and a flow of mail at this time. Incidentally, an operation within the mail server 10 is shown in FIG. 5. Incidentally, the contents themselves of FIG. 5 are evident from the drawing, so that the description is not made particularly.

[1]: Alice acquires a certificate in which an alias mail address (bob@bar.com) of Bob is mentioned from the directory server 21 for publication, and sends encryption mail to bob@bar.com.

[2]: The mail server 10 receives the encryption mail from Alice.

[3]: The mail server 10 decodes the encryption mail using a secret key corresponding to the certificate in which the alias mail address of Bob is mentioned.

[4]: The mail server 10 performs content confirmation of the decoded mail (for example, a virus check).

[5]: The mail server 10 acquires a certificate in which a real mail address (bob@mail.bar.com) of Bob is mentioned from the mail server dedicated directory server 12, and again encrypts the decoded mail to send the mail to bob@mail.bar.com for the attention of Bob.

[6]: Bob receives the encryption mail.

[Content Confirmation of Signature Mail from the Inside of a Company to the Outside of the Company]

Figure 7:
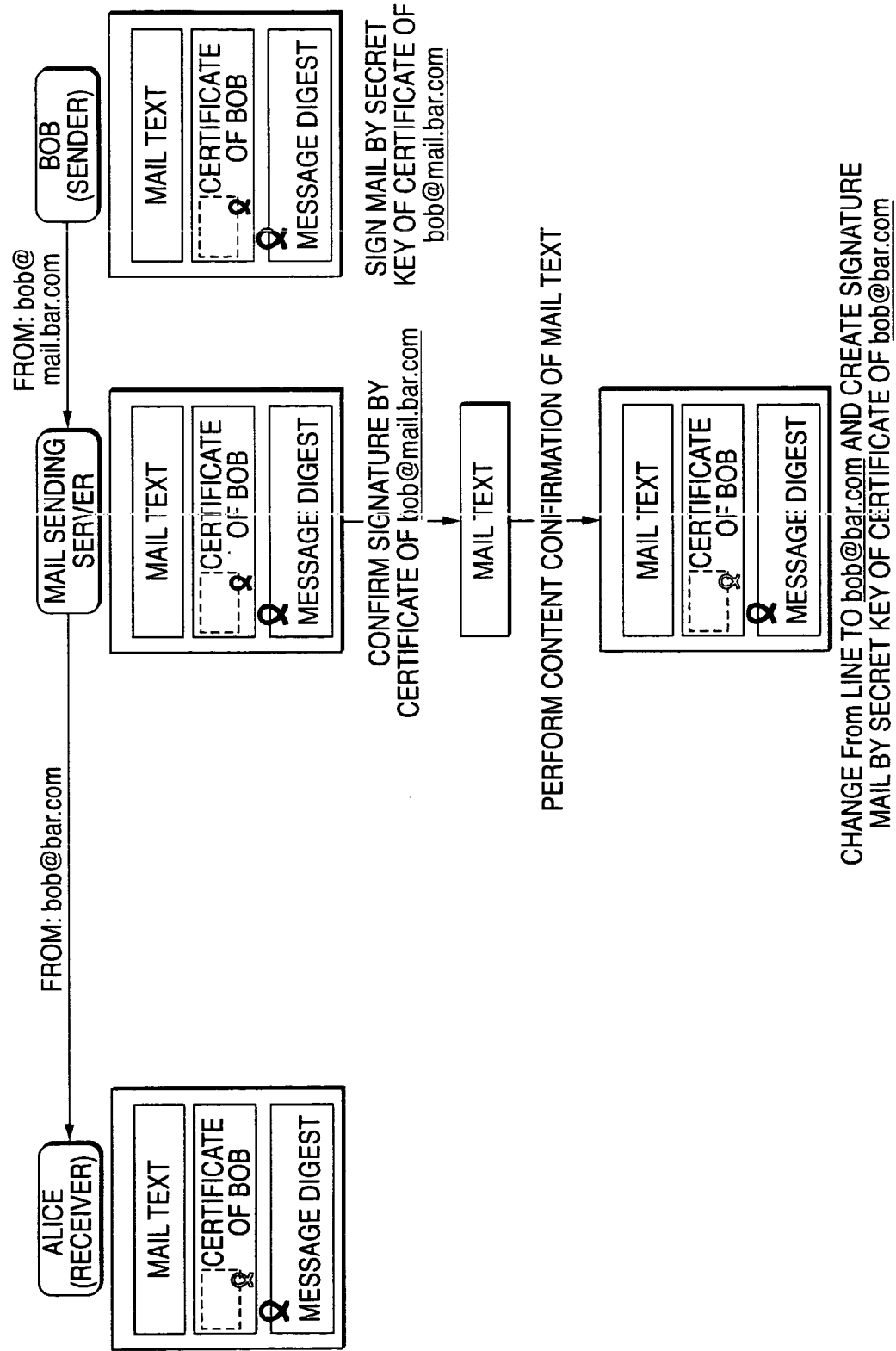
FIG. 7 is a diagram describing a flow of mail or processing to mail in the example of FIG. 6.
Figure 8:
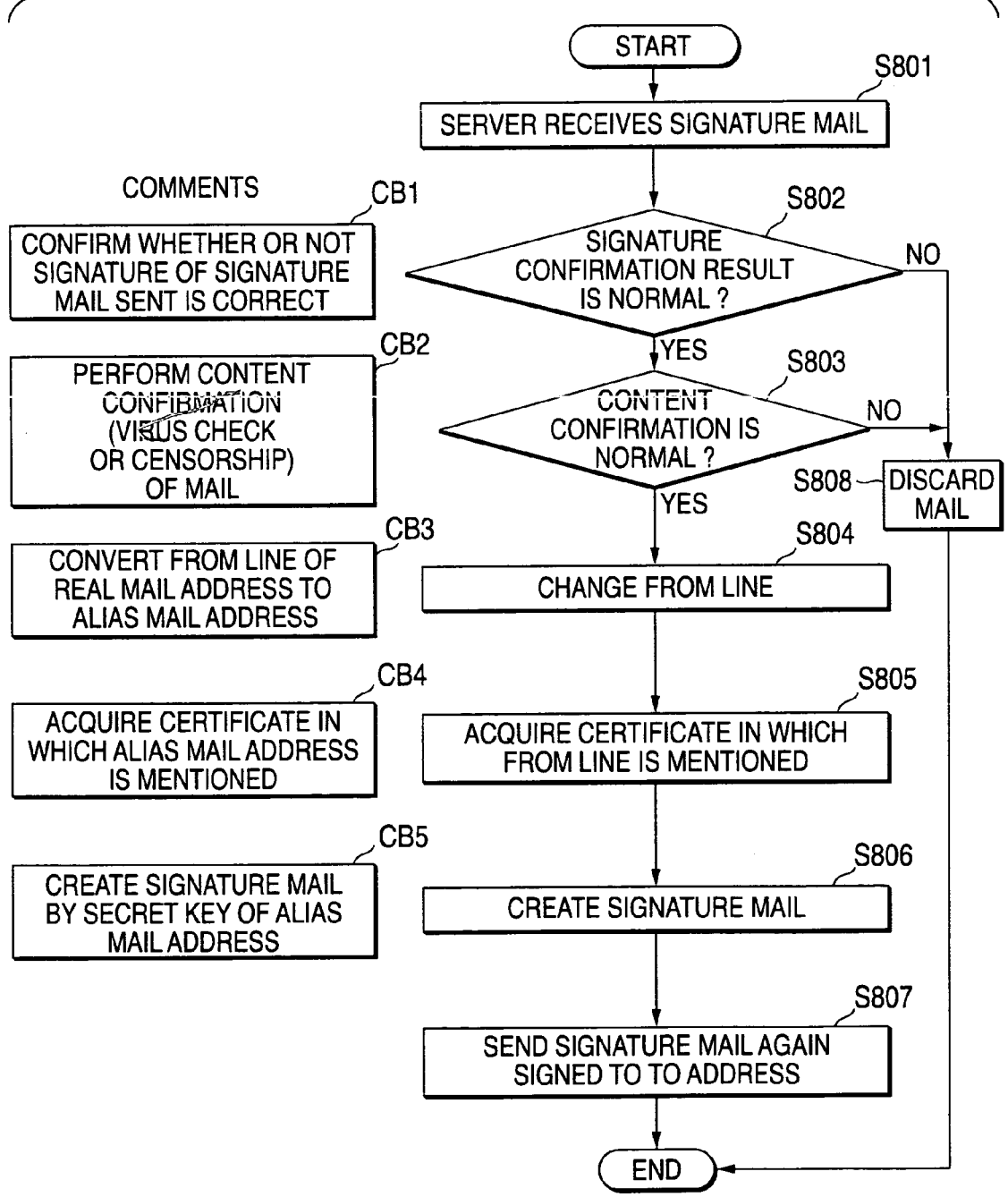
FIG. 8 is a flowchart describing an operation of the mail server in the example of FIG. 6.

Next, content confirmation of signature mail from the inside of a company to the outside of the company will be described. Here, characters as shown in FIG. 6 appear. A content confirmation method of signature mail and a sending method at the time when Bob (the inside of a company) sends signature mail to Alice (the outside of the company) will be described. FIG. 7 schematically shows a summary of processing to mail and a flow of mail at this time. Incidentally, an operation within the mail server 10 is shown in FIG. 8. Incidentally, the contents themselves of FIG. 8 are evident from the drawing, so that the description is not made particularly.

[1]: Bob sends signature mail to Alice using a secret key corresponding to a certificate in which a real mail address is mentioned.

[2]: The mail server 10 receives the signature mail from Bob.

[3]: The mail server 10 performs content confirmation of the mail after signature confirmation of the signature mail.

[4]: The mail server 10 changes a From line to an alias mail address of Bob, and creates a signature mail using a secret key corresponding to a certificate in which the alias mail address of Bob is mentioned.

[5]: The mail server 10 sends the signature mail to Alice.

[6]: Alice receives the signature mail.

[Content Confirmation of Encryption Signature Mail from the Inside of a Company to the Inside of the Company]

Figure 10:
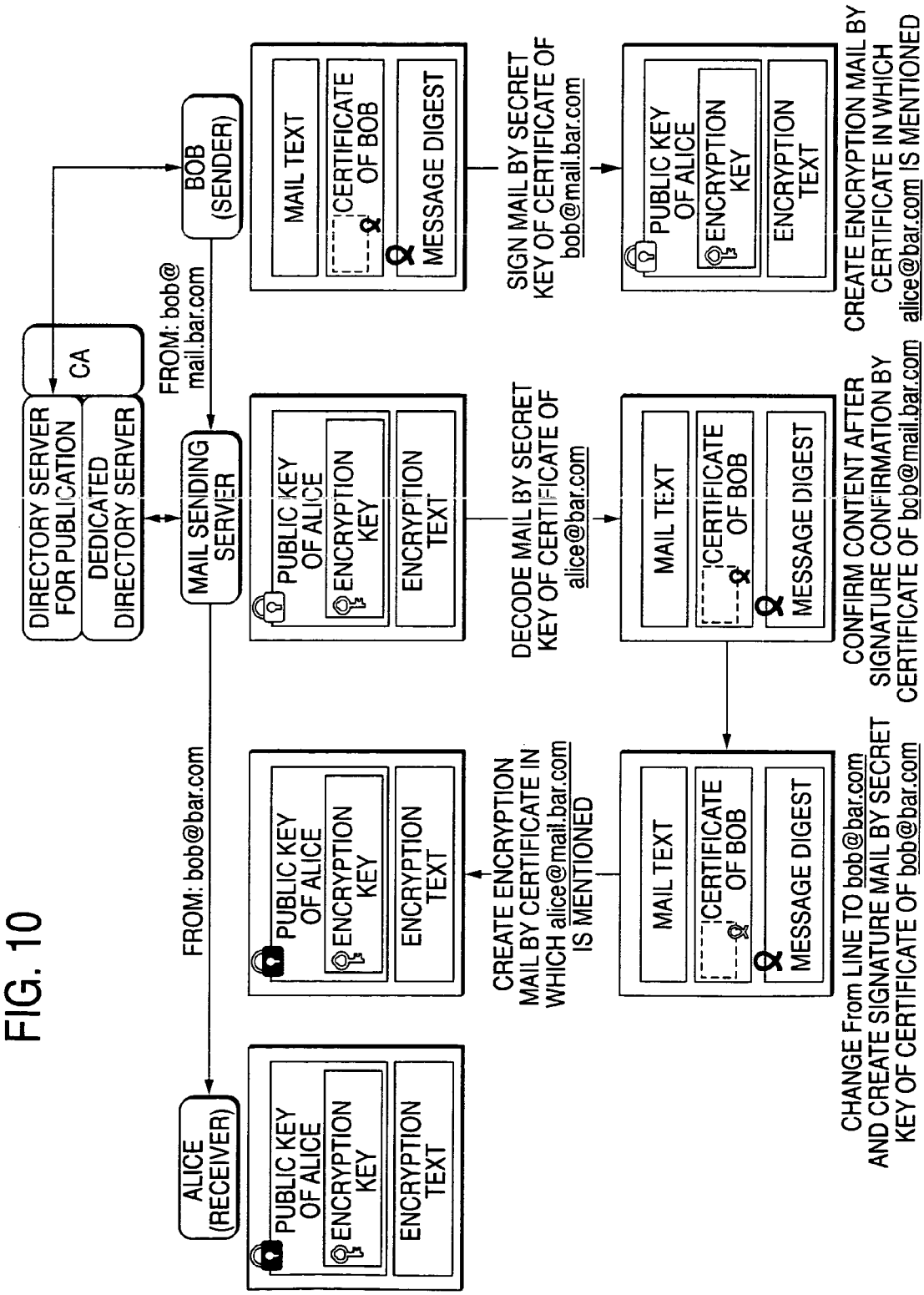
FIG. 10 is a diagram describing a flow of mail or processing to mail in the example of FIG. 9.
Figure 11:
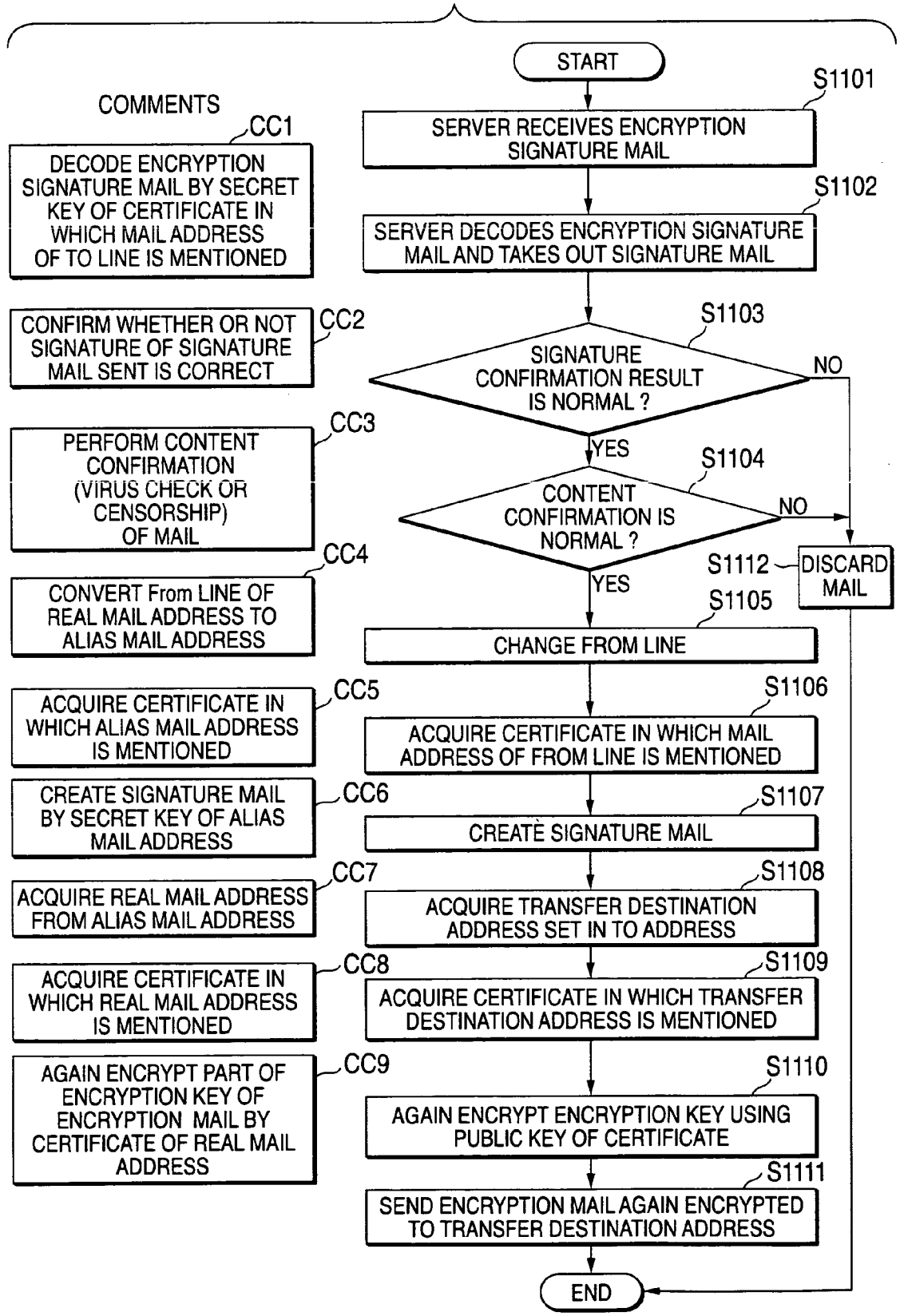
FIG. 11 is a flowchart describing an operation of the mail server in the example of FIG. 9.

Then, content confirmation of encryption signature mail from the inside of a company to the inside of the company will be described. Here, characters as shown in FIG. 9 appear. A content confirmation method of encryption signature mail and a sending method at the time when Bob (the inside of a company) sends encryption signature mail to Alice (the inside of the company) will be described. FIG. 10 schematically shows a summary of processing to mail and a flow of mail at this time. Incidentally, an operation within the mail server 10 is shown in FIG. 11. Incidentally, the contents themselves of FIG. 11 are evident from the drawing, so that the description is not made particularly.

[1]: Bob sends encryption signature mail to Alice using a secret key corresponding to a certificate in which a real mail address is mentioned and a certificate in which an alias mail address of Alice is mentioned.

[2]: The mail server 10 receives the encryption signature mail from Bob.

[3]: The mail server 10 performs content confirmation of the mail after decoding and signature confirmation of the encryption signature mail.

[4]: The mail server 10 changes a From line to an alias mail address of Bob, and creates a signature mail using a secret key corresponding to a certificate in which the alias mail address of Bob is mentioned.

[5]: The mail server 10 acquires a certificate of Alice in which a real mail address is mentioned, and encrypts and sends the signature mail for the attention of Alice.

[6]: Alice receives the encryption signature mail.

[Content Confirmation of Encryption Signature Mail from the Inside of a Company to the Outside of the Company]

Figure 13:
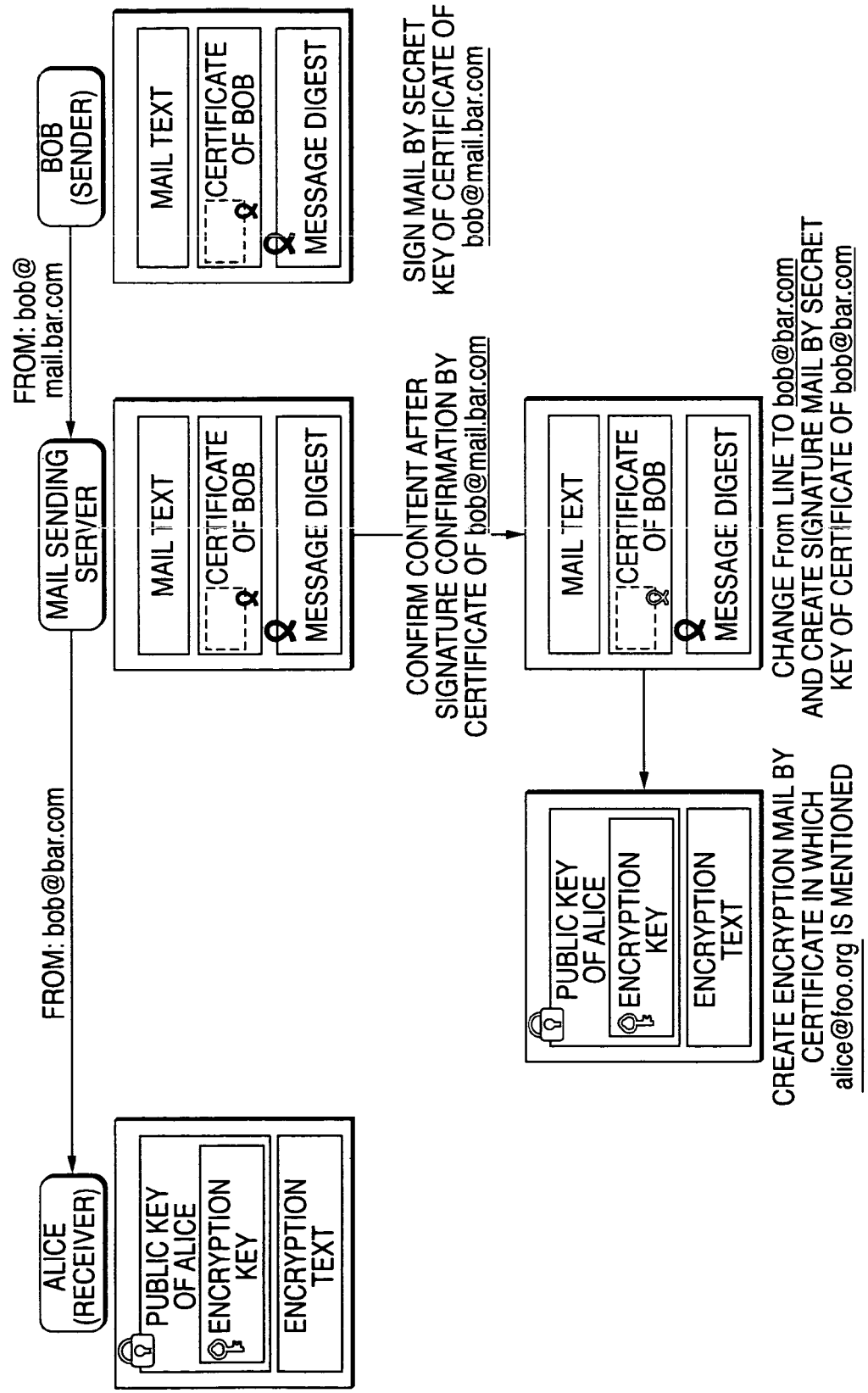
FIG. 13 is a diagram describing a flow of mail or processing to mail in the example of FIG. 12.
Figure 14:
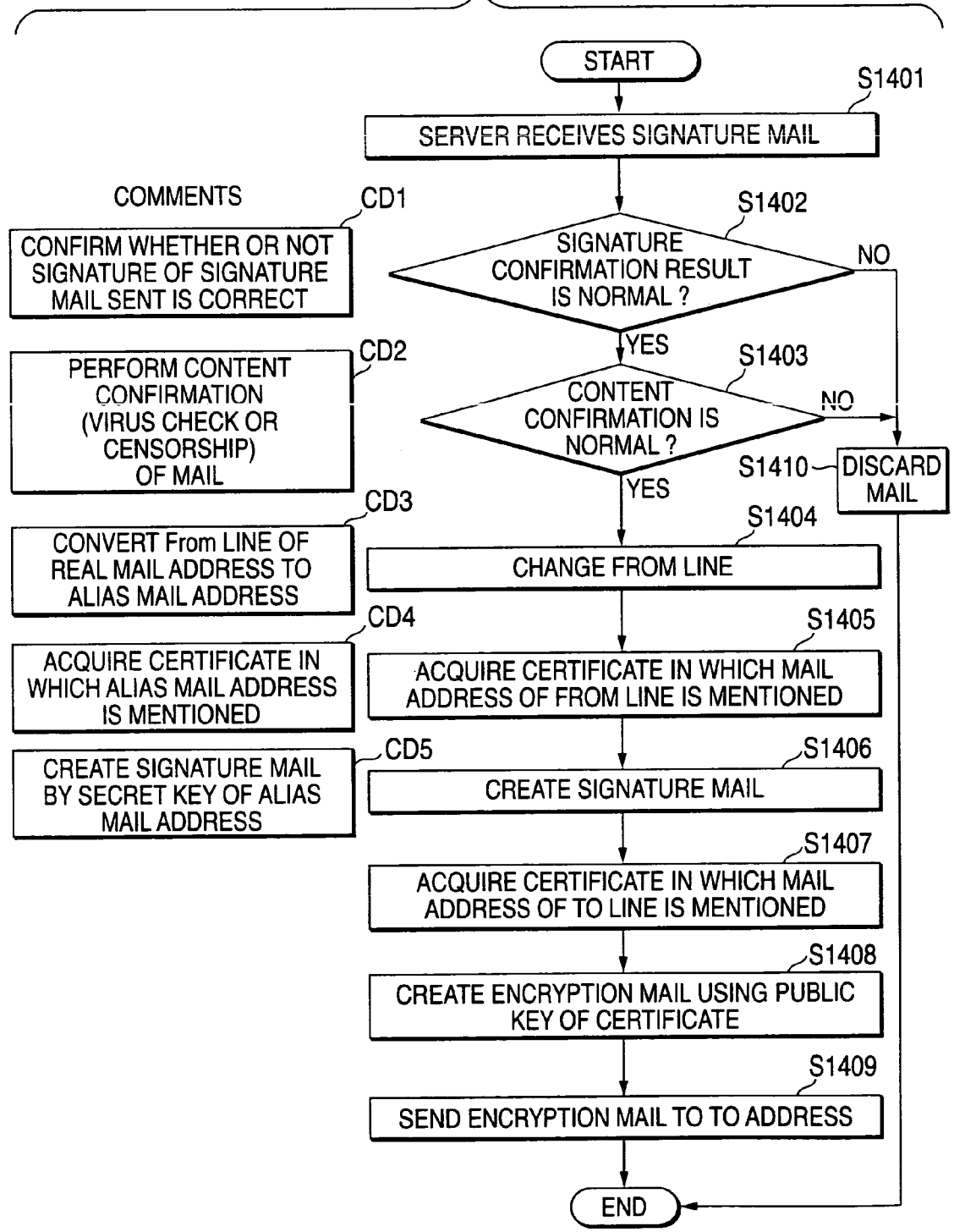
FIG. 14 is a flowchart describing an operation of the mail server in the example of FIG. 12.

Then, content confirmation of encryption signature mail from the inside of a company to the outside of the company will be described. Encryption itself is performed in the mail server 10. Here, characters as shown in FIG. 12 appear. A content confirmation method of encryption signature mail and a sending method at the time when Bob (the inside of a company) sends encryption signature mail to Alice (the outside of the company) will be described. FIG. 13 schematically shows a summary of processing to mail and a flow of mail at this time. Incidentally, an operation within the mail server 10 is shown in FIG. 14. Incidentally, the contents themselves of FIG. 14 are evident from the drawing, so that the description is not made particularly.

[1]: Bob sends signature mail to Alice using a secret key corresponding to a certificate in which a real mail address is mentioned. (Here, when Bob sends encryption mail to Alice, content confirmation cannot be performed in the mail server 10, so that it is necessary for Bob to send mail which is not encrypted to the mail server 10. In actual operation, it is considered that processing in which encryption mail is discarded and is not sent when the encryption mail from Bob arrives at the mail server 10 is performed.)

[2]: The mail server 10 receives the signature mail from Bob.

[3]: The mail server 10 performs content confirmation of the mail after signature confirmation of the signature mail.

[4]: The mail server 10 changes a From line to an alias mail address of Bob, and creates a signature mail using a secret key corresponding to a certificate in which the alias mail address of Bob is mentioned.

[5]: The mail server 10 acquires a certificate of Alice, and encrypts and sends the signature mail for the attention of Alice.

[6]: Alice receives the encryption signature mail. Incidentally, the invention is not limited to the embodiments described above, and various changes can be made without departing from the subject matter. For example, in the above description, the invention is applied to the mail server, but it may be constructed so as to apply a content confirmation technique of the invention to a front end or a back end of the mail server.

As described above, according to the invention, the contents of encryption mail can be confirmed. Also, a certificate can be intensively managed.

What is claimed is:

1. A mail processing apparatus, comprising:
a decoding information storage section which stores decoding information with respect to an encryption system for a first mail address of a mail user;
an encryption information storage section which stores encryption information about an encryption system for a second mail address of the mail user;
a section which receives electronic mail encrypted by the encryption system for the first mail address to a destination of the first mail address of the mail user;
a section which decodes the received encryption mail using the decoding information stored in the decoding information storage section;
a content confirmation section which confirms contents of the decoded mail;
a section which encrypts the mail whose contents are confirmed using the encryption information stored in the encryption information storage section; and
a section which sends the encrypted mail to a destination of the second mail address of the mail user.

2. A mail processing apparatus, comprising:
a receiving section which receives encryption mail sent from a first user to a proxy mail address of a second user;
a decoding section which decodes the encryption mail by a secret key corresponding to the proxy mail address of the second user; and
a sending section which sends the decoded encryption mail to a real mail address of the second user.

3. The mail processing apparatus as claimed in claim 2, further comprising a confirming section which confirms the contents of the decoded encryption mail.

4. A mail processing apparatus, comprising:
a receiving section which receives first encryption mail sent from a first user to a proxy mail address of a second user;
a decoding section which decodes the first encryption mail by a secret key corresponding to the proxy mail address of the second user;
an encryption section which generates second encryption mail in which the contents of the decoded first encryption mail are encrypted by a public key corresponding to a real mail address of the second user; and
a sending section which sends the second encryption mail to the real mail address of the second user.

5. A mail processing apparatus, comprising:
a section which receives a signature mail that includes an electronic signature corresponding to a first mail address of a sender;
a section which verifies the electronic signature of the signature mail;
a signature section which affixes a new electronic signature to the signature mail or mail in which the electronic signature is removed from the signature mail, wherein the new electronic signature corresponds to a second mail address of the sender, and the first and second mail addresses are different from each other; and
a section which delivers the mail to which the new electronic signature is affixed.

6. The mail processing apparatus as claimed in claim 5, further comprising a confirming section which confirms contents of the signature mail.

7. A mail signature apparatus comprising:
a signature verification information storage section which stores signature verification information for verifying a second electronic signature for a second mail address of a mail user;
an electronic signature information storage section which stores electronic signature information for affixing a first electronic signature for a first mail address of the mail user;
a section which receives signature mail sent from an originating source of the second mail address of the mail user;
a section which verifies the second electronic signature of the received signature mail by using the signature verification information stored in the signature verification information storage section;
a section which affixes the first electronic signature to the signature mail or mail in which the second electronic signature is removed from the signature mail by using the electronic signature information stored in the electronic signature information storage section; and
a section which sends the mail to which the first electronic signature is affixed using the first mail address of the mail user as an originating source.

8. A mail content confirmation apparatus, comprising:
a section which receives an encryption signature mail that includes an electronic signature corresponding to a first mail address of a sender;
a section which decodes the encryption mail;
a section which verifies the electronic signature of the decoded mail;
a content confirmation section which confirms contents of the decoded mail;
a section which affixes a new electronic signature to the mail whose contents are confirmed, wherein the new electronic signature corresponds to a second mail address of the sender, and the first and second mail addresses are different from each other;
a section which encrypts the mail to which the new electronic signature is affixed; and
a section which delivers the encrypted mail to which the new electronic signature is affixed to a destination.

9. A mail processing method, comprising:
receiving encryption mail sent from a first user to a proxy mail address of a second user;

decoding the encryption mail by a secret key corresponding to the proxy mail address of the second user; and sending the decoded encryption mail to a real mail address of the second user.

10. The mail processing method of claim 9, further comprising:

confirming contents of the encryption mail after the encryption mail is decoded.

11. A mail processing method, comprising:

receiving first encryption mail sent from a first user to a proxy mail address of a second user;

decoding the first encryption mail by a secret key corresponding to the proxy mail address of the second user;

generating second encryption mail in which the contents of the decoded first encryption mail are encrypted by a public key corresponding to a real mail address of the second user; and sending the second encryption mail to the real mail address of the second user.

12. A mail processing method, comprising:

receiving a signature mail that includes an electronic signature corresponding to a first mail address of a sender;

verifying the electronic signature of the signature mail;

affixing a new electronic signature to the signature mail or mail in which the electronic signature is removed from the signature mail, wherein the new electronic signature corresponds to a second mail address of the sender, and the first and second mail addresses are different from each other; and delivering the mail to which the new electronic signature is affixed.

13. A mail processing method, comprising:

receiving an encryption signature mail that includes an electronic signature corresponding to a first mail address of a sender;

decoding the encryption signature mail;

verifying the electronic signature of the decoded mail;

confirming contents of the decoded mail;

affixing a new electronic signature to the mail whose contents are confirmed, wherein the new electronic signature corresponds to a second mail address of the sender, and the first and second mail addresses are different from each other;

encrypting the mail to which the new electronic signature is affixed; and delivering the encrypted mail to which the new electronic signature is affixed to a destination.

14. A record medium for recording a computer program for mail processing, the computer program causing a computer to execute:

receiving encryption mail sent from a first user to a proxy mail address of a second user;

decoding the encryption mail by a secret key corresponding to the proxy mail address of the second user; and sending the decoded encryption mail to a real mail address of the second user.

15. The record medium as claimed in claim 14, further comprising:

confirming contents of the encryption mail after the encryption mail is decoded.

16. A record medium for recording a computer program for mail processing, the computer program causing a computer to execute:

receiving first encryption mail sent from a first user to a proxy mail address of a second user;

decoding the first encryption mail by a secret key corresponding to the proxy mail address of the second user;

generating second encryption mail in which the contents of the decoded first encryption mail are encrypted by a public key corresponding to a real mail address of the second user; and sending the second encryption mail to the real mail address of the second user.

17. A record medium for recording a computer program for mail processing, the computer program causing a computer to execute:

receiving a signature mail that includes an electronic signature corresponding to a first mail address of a sender;

verifying the electronic signature of the signature mail;

affixing a new electronic signature to the signature mail or mail in which the electronic signature is removed from the signature mail, wherein the new electronic signature corresponds to a second mail address of the sender, and the first and second mail addresses are different from each other; and delivering the mail to which the new electronic signature is affixed.

18. A record medium for recording a computer program for mail processing, the computer program causing a computer to execute:

receiving an encryption signature mail that includes an electronic signature corresponding to a first mail address of a sender;

decoding the encryption mail;

verifying electronic signature of the decoded mail;

confirming contents of the decoded mail;

affixing a new electronic signature to the mail whose contents are confirmed, wherein the new electronic signature corresponds to a second mail address of the sender, and the first and second mail addresses are different from each other;

encrypting the mail to which the new electronic signature is affixed; and delivering the encrypted mail to which the new electronic signature is affixed to a destination.

* * * * *